(12) United States Patent
Zoller

(10) Patent No.: US 8,652,631 B2
(45) Date of Patent: Feb. 18, 2014

(54) POLYMER FOAMS

(75) Inventor: Panu K. Zoller, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/375,623

(22) PCT Filed: Jun. 14, 2010

(86) PCT No.: PCT/US2010/038498
§ 371 (c)(1),
(2), (4) Date: Dec. 1, 2011

(87) PCT Pub. No.: WO2010/147888
PCT Pub. Date: Dec. 23, 2010

(65) Prior Publication Data
US 2012/0088091 A1    Apr. 12, 2012

Related U.S. Application Data

(60) Provisional application No. 61/218,238, filed on Jun. 18, 2009.

(51) Int. Cl.
*B32B 7/12* (2006.01)
*C08J 9/32* (2006.01)

(52) U.S. Cl.
USPC ............... 428/317.3; 428/317.9; 428/343; 428/355 AC; 428/355 BL; 521/76

(58) Field of Classification Search
USPC ...... 428/317.9, 343, 317.3, 355 AC, 355 BL; 521/76
See application file for complete search history.

(56) References Cited

U.S. PATENT DOCUMENTS

| | | | |
|---|---|---|---|
| 4,710,536 A | 12/1987 | Klingen et al. | |
| 5,100,728 A | 3/1992 | Plamthottam et al. | |
| 5,296,547 A | 3/1994 | Nestegard et al. | |
| 5,393,373 A | 2/1995 | Jun et al. | |
| 6,103,152 A | 8/2000 | Gehlsen et al. | |
| 6,204,350 B1 | 3/2001 | Liu et al. | |
| 6,780,484 B2 | 8/2004 | Kobe et al. | |
| 6,797,371 B1 | 9/2004 | Gehlsen et al. | |
| 6,805,933 B2 | 10/2004 | Patel et al. | |
| 6,835,422 B2 | 12/2004 | Kobe et al. | |
| 6,864,322 B2 | 3/2005 | Gehlsen et al. | |
| 2002/0007014 A1* | 1/2002 | Hyde et al. .................. 525/191 |
| 2004/0197545 A1 | 10/2004 | Gehlsen et al. | |

(Continued)

FOREIGN PATENT DOCUMENTS

| | | |
|---|---|---|
| JP | 2008-120903 | 5/2008 |
| JP | 2008-285657 | 11/2008 |
| WO | WO 02/062881 | 8/2002 |
| WO | WO 2008/070386 | 6/2008 |

OTHER PUBLICATIONS

ASTM D1993-03(2008) "Standard Test Method for Precipitated Silica-Surface Area by Multipoint BET Nitrogen Adsorption."

(Continued)

*Primary Examiner* — Hai Vo
(74) *Attorney, Agent, or Firm* — Dena M. Ehrich

(57) ABSTRACT

Polymer foams, including acrylic foams, comprising low amounts of high-surface-area silica are described. Methods of preparing such foams and articles comprising such foams are also described.

10 Claims, 1 Drawing Sheet

(56) References Cited

U.S. PATENT DOCUMENTS

| | | | |
|---|---|---|---|
| 2005/0064183 A1* | 3/2005 | Lunsford et al. | 428/354 |
| 2006/0135635 A1* | 6/2006 | deVry | 521/142 |
| 2008/0184642 A1* | 8/2008 | Sebastian et al. | 52/309.4 |
| 2010/0010723 A1 | 1/2010 | Taki et al. | |
| 2010/0075129 A1 | 3/2010 | Nagasaki et al. | |

OTHER PUBLICATIONS

PCT International Search Report, PCT/US2010/038498, dated Feb. 21, 2011, 5 pages.

* cited by examiner

POLYMER FOAMS

CROSS REFERENCE TO RELATED APPLICATIONS

This application is a national stage filing under 35 U.S.C. 371 of PCT/US2010/038498, filed Jun. 14, 2010, which claims priority to U.S. Provisional Application No. 61/218,238, filed Jun. 18, 2009, the disclosure of which is incorporated by reference in its/their entirety herein.

FIELD

The present disclosure relates to polymeric foams containing low amounts of high-surface-area silica. Hot melt adhesive foams, tapes incorporating such foams, and methods of preparing them are also described.

SUMMARY

Briefly, in one aspect, the present disclosure provides a foam comprising a polymer, a plurality of at least partially expanded expandable polymeric microspheres, and 0.3 to 1.5% by weight of a silica having a surface area of at least 300 square meters per gram as measured according to ASTM D1993-03(2008). In some embodiments, the foam comprises at least 0.5% by weight of the silica. In some embodiments, the foam comprises no greater than 1% by weight of the silica.

In some embodiments, the polymer comprises an acrylic polymer. In some embodiments, the polymer comprises a blend of a low molecular weight acrylic polymer and a high molecular weight acrylic polymer.

In some embodiments, the foam tape comprises the foam and a first adhesive bonded to a first surface of the foam. In some embodiments, the foam tape further comprises a second adhesive bonded to a second surface of the foam opposite the first adhesive.

In some embodiments, at least one of the first adhesive and the second adhesive comprises a pressure sensitive adhesive. In some embodiments, at least one of the first adhesive and the second adhesive comprises a heat-activated adhesive. In some embodiments, at least one of the first adhesive and the second adhesive comprises an acrylic polymer. In some embodiments, at least one of the first adhesive and the second adhesive comprises a block copolymer. In some embodiments, at least one of the first adhesive and the second adhesive comprises a silicone polymer. In some embodiments, at least one of the first adhesive and the second adhesive comprises a blend of at least two polymers selected from the group consisting of an acrylic polymer, a block copolymer, and a silicone polymer.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
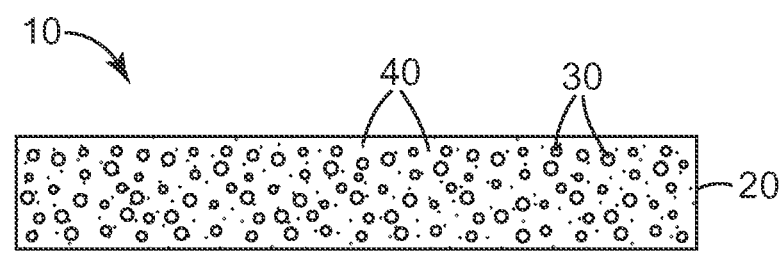
FIG. 1 illustrates an exemplary foam according to some embodiments of the present disclosure.

Gehlsen et al. (U.S. Pat. Nos. 6,103,152 and 6,797,371) describe a variety of methods for producing polymer foams, including acrylic foams. In some embodiments, the methods include melt mixing a polymer composition with at least one expandable polymeric microsphere ("epm") and extruding the composition through a die to form a polymer foam. These foams may then be electron beam ("E-beam") cured. The foams may be combined with one or more adhesive layers to form adhesive articles, e.g., an article comprising a layer of a skin adhesive on each major surface of a foam core.

While such adhesive articles have been used successfully in a wide variety of applications, the present inventor has discovered that the addition of small amounts of high-surface-area silica to the foam core results in a surprising improvement in a number of key mechanical properties including one or more of elongation at break, cohesive strength, and interlayer adhesion.

In some embodiments, the present disclosure provides a foam comprising a polymer, a plurality of at least partially expanded expandable polymeric microspheres, and 0.5 to 1.5% by weight of silica having a BET surface area of at least 300 square meters per gram.

Generally, the choice of polymer is not particularly limited. In some embodiments, it may be desirable to select polymers or blends of polymers that are suitable for melt extrusion processing. Exemplary polymers include acrylic polymers, acrylate-insoluble polymers, elastomers containing ultraviolet radiation-activatable groups, and polymers prepared from non-photopolymerizable monomers.

In some embodiments, the polymer may comprise one or more acrylic polymers, e.g., acrylate and methacrylate adhesive polymers and copolymers. As used herein, the term "(meth)acrylate" means acrylate and/or methacrylate, i.e., ethyl(meth)acrylate refers to ethyl acrylate and/or ethyl (meth)acrylate.

In some embodiments, the acrylic polymer comprises the reaction product of at least one acrylic or methacrylic ester of a non-tertiary alkyl alcohol and, optionally, at least one copolymerized reinforcing monomer. In some embodiments, the acrylic polymer comprises at least about 70 parts, in some embodiments, at least about 80 parts, at least about 90 parts, at least about 95 parts, or even about 100 parts of at least one acrylic or methacrylic ester of a non-tertiary alkyl alcohol. In some embodiments, acrylic adhesive composition comprises no greater than about 30 parts, in some embodiments, no greater than about 20 parts, no greater than about 10 parts, no greater than about 5 parts, and even no greater than 1 part of at least one copolymerized reinforcing monomer. In some embodiments, the acrylic adhesive composition does not include a copolymerized reinforcing monomer.

In some embodiments, the non-tertiary alkyl alcohol contains 4 to 20 carbon atoms. Exemplary acrylic acid esters include isooctyl acrylate, 2-ethylhexyl acrylate, butyl acrylate, isobornyl acrylate, and combinations thereof. Exemplary methacrylic acid esters include the methacrylate analogues of these acrylic acid esters.

In some embodiments, the copolymerized reinforcing monomer is selected from the group consisting of acrylic acid, methacrylic acid, 2-carboxyethyl acrylate, N,N' dimethyl acrylamide, N,N' diethyl acrylamide, butyl carbamoyl ethyl acrylate, and combinations thereof In some embodiments, it may be desirable to combine at least one high molecular weight (meth)acrylate polymer with at least one low molecular weight (meth)acrylate polymer.

In some embodiments, the polymer may include a block copolymer. In some embodiments, the block copolymer comprises a rubbery block, R, and at least one glassy block, G. In some embodiments, the block copolymer comprises at least three glassy blocks. In some embodiments, the first block copolymer comprises between three and five glassy blocks, inclusive. In some embodiments, the first block copolymer comprises four glassy blocks.

In some embodiments, the first block copolymer is a multi-arm block copolymer having the general formula $Q_n$–Y, wherein Q represents an arm of the multi-arm block copolymer; n represents the number of arms and is a whole number of at least 3; and Y is the residue of a multifunctional coupling agent. Each arm, Q, independently has the formula R–G, wherein G represents the glassy block; and R represents the rubbery block.

Generally, a rubbery block exhibits a glass transition temperature (Tg) of less than room temperature. In some embodiments, the Tg of the rubbery block is less than about 0° C., or even less than about –10° C. In some embodiments, the Tg of the rubbery block is less than about –40° C., or even less than about –60° C.

Generally, a glassy block exhibits a Tg of greater than room temperature. In some embodiments, the Tg of the glassy block is at least about 40° C., at least about 60° C., at least about 80° C., or even at least about 100° C.

In some embodiments, the rubbery block comprises a polymerized conjugated diene, a hydrogenated derivative of a polymerized conjugated diene, or combinations thereof. In some embodiments, the conjugated dienes comprise 4 to 12 carbon atoms. Exemplary conjugated dienes include butadiene, isoprene, ethylbutadiene, phenylbutadiene, piperylene, pentadiene, hexadiene, ethylhexadiene, and dimethylbutadiene. The polymerized conjugated dienes may be used individually or as copolymers with each other. In some embodiments, the conjugated diene is selected from the group consisting of isoprene, butadiene, ethylene butadiene copolymers, and combinations thereof In some embodiments, at least one glassy block comprises a polymerized monovinyl aromatic monomer. In some embodiments, both glassy blocks of a triblock copolymer comprise a polymerized monovinyl aromatic monomer. In some embodiments, the monovinyl aromatic monomers comprise 8 to 18 carbon atoms. Exemplary monovinyl aromatic monomers include styrene, vinylpyridine, vinyl toluene, alpha-methyl styrene, methyl styrene, dimethylstyrene, ethylstyrene, diethyl styrene, t-butylstyrene, di-n-butylstyrene, isopropylstyrene, other alkylated-styrenes, styrene analogs, and styrene homologs. In some embodiments, the monovinyl aromatic monomer is selected from the group consisting of styrene, styrene-compatible monomers or monomer blends, and combinations thereof.

As used herein, "styrene-compatible monomers or monomer blends" refers to a monomer or blend of monomers, which may be polymerized or copolymerized, that preferentially associate with polystyrene or with the polystyrene endblocks of a block copolymer. The compatibility can arise from actual copolymerization with monomeric styrene; solubility of the compatible monomer or blend, or polymerized monomer or blend in the polystyrene phase during hot melt or solvent processing; or association of the monomer or blend with the styrene-rich phase domain on standing after processing.

In the general formula for some multi-arm block copolymers of the present disclosure, $Q_n$–Y, n represents the number of arms and is a whole number of at least 3, i.e., the multi-arm block copolymer is a star block copolymer. In some embodiments, n is ranges from 3-10. In some embodiments, n ranges from 3-5. In some embodiments, n is 4. In some embodiments, n is equal to 6 or more.

In some embodiments, the block copolymer is a polymodal block copolymer. As used herein, the term "polymodal" means that the copolymer comprises glassy blocks having at least two different molecular weights. Such a block copolymer may also be characterized as having at least one "high" molecular weight glassy block, and at least one "low" molecular weight glassy block, wherein the terms high and low are used relative to each other. In some embodiments the ratio of the number average molecular weight of the high molecular weight glassy block, $(Mn)_H$, relative to the number average molecular weight of the low molecular weight glassy block, $(Mn)_L$, is at least about 1.25.

In some embodiments, $(Mn)_H$ ranges from about 5,000 to about 50,000 grams/mole. In some embodiments, $(Mn)_H$ is at least about 8,000, and in some embodiments at least about 10,000 gm/mole. In some embodiments, $(Mn)_H$ is no greater than about 35,000 gm/mole. In some embodiments, $(Mn)_L$ ranges from about 1,000 to about 10,000 gm/mole. In some embodiments, $(Mn)_L$ is at least about 2,000, and, in some embodiments, at least about 4,000 gm/mole. In some embodiments, $(Mn)_L$ is less than about 9,000, and, in some embodiments, less than about 8,000 gm/mole.

In some embodiments, the block copolymer is an asymmetric block copolymer. As used herein, the term "asymmetric" means that the arms of the block copolymer are not all identical. Generally, a polymodal block copolymer is an asymmetric block copolymer (i.e., a polymodal asymmetric block copolymer) as not all arms of a polymodal block copolymer are identical since the molecular weights of the glassy blocks are not all the same. In some embodiments, the block copolymers of the present disclosure are polymodal, asymmetric block copolymers. Methods of making asymmetric, polymodal block copolymers are described in, e.g., U.S. Pat. No. 5,296,547.

Generally, the multifunctional coupling agent may be any polyalkenyl coupling agent or other material known to have functional groups that can react with carbanions of the living polymer to form linked polymers. The polyalkenyl coupling agent may be aliphatic, aromatic, or heterocyclic. Exemplary aliphatic polyalkenyl coupling agents include polyvinyl and polyalkyl acetylenes, diacetylenes, phosphates, phosphites, and dimethacrylates (e.g., ethylene dimethacrylate). Exemplary aromatic polyalkenyl coupling agents include polyvinyl benzene, polyvinyl toluene, polyvinyl xylene, polyvinyl anthracene, polyvinyl naphthalene, and divinyldurene. Exemplary polyvinyl groups include divinyl, trivinyl, and tetravinyl groups. In some embodiments, divinylbenzene (DVB) may be used, and may include o-divinyl benzene, m-divinyl benzene, p-divinyl benzene, and mixtures thereof. Exemplary heterocyclic polyalkenyl coupling agents include divinyl pyridine, and divinyl thiophene. Other exemplary multifunctional coupling agents include silicon halides, polyepoxides, polyisocyanates, polyketones, polyanhydrides, and dicarboxylic acid esters.

In some embodiments, the block copolymer may be a linear block copolymer. A linear block copolymer can be described by the formula

$R–(G)_m$ wherein R represents a rubbery block, G represents a glassy block, and m, the number of glassy blocks, is 1 or 2. In some embodiments, m is one, and the linear block copolymer is a diblock copolymer comprising one rubbery block and one glassy block. In some embodiments, m is two, and the linear block copolymer comprises two glassy endblocks and one rubbery midblock, i.e., the linear block copolymer is a triblock copolymer.

In some embodiments, the rubbery block of the second block copolymer comprises a polymerized conjugated diene, a hydrogenated derivative thereof, or combinations thereof. In some embodiments, the conjugated dienes comprise 4 to 12 carbon atoms. Exemplary conjugated dienes include any of the exemplary conjugated dienes described above.

In some embodiments, at least one glassy block, and in some embodiments, each glassy block of the second block copolymer comprises a polymerized monovinyl aromatic monomer. In some embodiments, the monovinyl aromatic monomers comprise 8 to 18 carbon atoms. Exemplary polymerized monovinyl aromatic monomers include any of the exemplary polymerized monovinyl aromatic monomer, as described above.

In some embodiments, the polymer may comprise a silicone polymer.

In some embodiments, the polymer may include blends of two or more polymers, e.g., blends of high and low molecular weight acrylic polymers, blends of one or more acrylic polymers with one or more block copolymers, and the like.

Expandable polymeric microspheres generally feature a flexible, thermoplastic, polymeric shell surrounding a core comprising a liquid and/or gas that expands upon heating. Examples of commercially available expandable polymeric microspheres include those available under the trade name MICROPEARL from Pierce & Stevens (Buffalo, New York) and Henkel AG; and EXPANCEL from Akzo-Nobel.

Generally, the amount of expandable microspheres is selected based upon the desired properties of the foam. In general, the greater the amount of microspheres, the lower the resulting density of the foam. In some embodiments, the foam comprises at least 0.1 part by weight, and in some embodiments at least 0.5 parts by weight expandable microspheres per 100 part of polymer resin. In some embodiments, the foam comprises no greater than 50 parts by weight, in some embodiments, no greater than 20 parts by weight expandable microspheres per 100 part of polymer resin.

The foams of the present disclosure include small amounts of a high-surface area silica. In some embodiments, the foam comprises 0.3 to 1.5 parts by weight silica per 100 parts of polymer resin. In some embodiments, the foam comprises at least 0.5, or even 0.7 parts by weight silica per 100 parts of polymer resin. In some embodiments, the foam comprises no greater than, 1.4 parts, or even no greater than 1 part by weight silica per 100 parts of polymer resin.

The silica particles have a high surface area relative to the silicas that have typically been added as fillers. In some embodiments, the surface area of the silica is at least 300 square meters per gram, in some embodiments, at least 320 square meters per gram, as measured according to ASTM D1993-03(2008) "Standard Test Method for Precipitated Silica-Surface Area by Multipoint BET Nitrogen Adsorption."

EXAMPLES

TABLE 1

Materials used in the preparation of the examples.

| I.D. | Description | Source |
| --- | --- | --- |
| Silica-1 | CAB-O-SIL M-5 fumed silica | Cabot Corporation (Boston, MA) |
| Silica-2 | CAB-O-SIL PTG fumed silica | Cabot Corporation |
| Silica-3 | CAB-O-SIL HS-5 fumed silica | Cabot Corporation |
| Silica-4 | CAB-O-SIL EH-5 fumed silica | Cabot Corporation |
| Silica-5 | CAB-O-SIL TS-720 surface-treated fumed silica | Cabot Corporation |

TABLE 1-continued

Materials used in the preparation of the examples.

| I.D. | Description | Source |
| --- | --- | --- |
| F-100 | MIROPEARL expandable polymeric microspheres | Pierce & Stevens (Buffalo, NY) |
| 2-EHA | 2-ethylhexyl acrylate | |
| BA | butyl acrylate | |
| AA | acrylic acid | |
| IRGACURE 651 | 2,2 dimethoxy-2-phenylacetophenone | Ciba Specialty Chemicals Corp. (Tarrytown, NY) |
| IOTG | isooctyl thioglycolate | |
| KRATON 1161-D | SIS linear block copolymer (15% S, 19% diblock) | Kraton Polymers, Inc. (Houston, Texas) |
| 4900 CMB | Black pigment having a 50/50 blend of carbon black in ethylene vinyl acetate copolymer resin having a melt index of about 150 | M A Hanna Color (Suwanee, Georgia) |
| IRGANOX 1010 | Pentaerythritol tetrakis (3-(3,5-di-tert-butyl-4-hydroxyphenyl)proprionate | Ciba Specialty Chemical Co. (Tarrytown, NY) |
| TINUVIN 328 | 2-(2-hydroxy-3,5-di-(tert)-amylphenyl)benzotriazole | Ciba Special Chemicals Co. (Tarrytown, NY) |
| REGALITE R1125 | Hydrogenated hydrocarbon resin | Eastman Chemical Co. (Kingsport, TN) |
| CUMAR 130 | Aromatic thermoplastic resin | Neville Chemical Co. (Pittsburgh, PA) |
| NYPLAST 222B | Naphthenic oil plasticizer | Nynas Naphthenics AB (Stockholm, Sweden) |

Preparation of Acrylic Polymers

Acrylic Polymer 1 (AP-1) was prepared by mixing 90 parts of 2-EHA; 10 parts of AA; 0.15 part IRGACURE 651; and 0.03 part of IOTG. Discreet film packages were formed from a packaging film (0.0635 mm thick ethylene vinyl acetate copolymer film sold as VA-24 Film from CT Film, Dallas, Tex.). The AP-1 composition was sealed into the film packages, which measured approximately 10 centimeters (cm) by 5 cm by 0.5 cm thick. While immersed in a water bath maintained between about 21° C. and about 32° C., the packages were exposed to ultraviolet (UV) radiation having an intensity of about 3.5 milliWatts per square centimeter (mW/sq cm), and a total energy of about 1680 milliJoules per square centimeter (mJ/sq cm) as measured in NIST units. The method of forming the packages and curing are described in Example 1 of U.S. Pat. No. 5,804,610, the subject matter of which is incorporated herein by reference in its entirety.

Acrylic Polymer 2 (AP-2) was prepared according to the procedure for AP-1, except that 85 parts of 2-EHA; 15 parts of AA; 0.15 parts of IRGACURE 651; and 0.8 part IOTG were used. Similarly, Acrylic Polymer 3 (AP-3) was prepared according to the procedure for Acrylic Polymer 1 except that the composition was 95 parts of 2-EHA; 5 parts of AA; 0.15 part IRGACURE 651; and 0.02 part of IOTG. Similarly, Acrylic Polymer 4 (AP-4) was prepared by mixing 45 parts of IOA; 45 parts of BA; 10 parts of AA; 0.15 part IRGACURE 651; and 0.06 part of IOTG. Acrylic Polymer AP-5 by mixing 90 parts of 2-EHA; 10 parts of AA; 0.15 part IRGACURE 651; and 0.02 part of IOTG. AP-2, AP-3, AP-4, and AP-5 were placed in packages and exposed to UV energy, according to the procedure for AP-1.

Solid (unfoamed) samples were prepared according to the compositions set forth in Table 2 as follows. For each sample. The identified amounts of AP-1 and AP-2 were placed in the bowl of kneading mixture fitted with BANBURY mixing blades, as supplied by Brabender. The materials were mixed at 121° C. (250° F.) and 60 rpm for three minutes.

These samples were evaluated according to the Dynamic Shear Test Procedure. The results are reported in Table 2.

Dynamic Shear Test Procedure. Two 30 mm by 70 mm aluminum panels were primed with N200J primer (3M Company). A 25 mm by 25 mm sample of the tape was positioned between the primed surfaces of the aluminum panels, bonding them together near the ends such that the unbonded portions of the 70 mm dimension of the panels extended in opposite directions. The bonded specimen was aged at room temperature for 24 hours. The unbonded portions of the aluminum panels were clamped in the jaws of an INSTRON tensile tester such that when the jaws were separated, a shear force was cereated across the thickness of the tape sample. The jaws were separated at 1.3 mm per minute (0.05 inch per minute) and the peak force is reported in Table 2.

TABLE 2

Composition and dynamic shear of solid acrylate samples.

| Sample | Silica I.D. | Silica Surface Area* | Silica Wt. % | AP-3 Wt. % | AP-2 Wt. % | Dynamic Shear kg/(25 × 25 mm) |
|---|---|---|---|---|---|---|
| CE-1 | none | — | 0 | 93% | 7% | 23.9 |
| CE-2 | PTG | 200 m²/gram | 2% | 91% | 7% | 23.6 |
| CE-3 | TS-720 | 115 m²/gram | 2% | 91% | 7% | 26.6 |
| EX-1 | HS-5 | 325 m²/gram | 2% | 91% | 7% | 31.1 |
| EX-2 | EH-5 | 380 m²/gram | 2% | 91% | 7% | 32.6 |

*as measured according to ASTM D1993-03(2008) "Standard Test Method for Precipitated Silica-Surface Area by Multipoint BET Nitrogen Adsorption."

Foam Core Tape Preparation Procedure.

Skin Adhesive Preparation Procedure. A pressure-sensitive adhesive was compounded using a 60 mm, co-rotating twin screw extruder (available from Berstorff). A polymodal, asymmetric star block copolymer ("PASBC") was prepared according to U.S. Pat. No. 5,393,373, the subject matter of which is hereby incorporated by reference in its entirety. The polymer had number average molecular weights of about 4,000 Dalton and about 21,500 Dalton for the two endblocks, 127,000-147,000 Dalton for the arm, and about 1,100,000 Dalton for the star measured by SEC (size exclusion chromatography) calibrated using polystyrene standards. The polystyrene content was between 9.5 and 11.5 percent by weight. The mole percentage of high molecular weight arms was estimated to be about 30%.

The polymodal asymmetric block copolymer (31.2 wt. %) and a linear styrene-isoprene-styrene (SIS) block copolymer (KRATON 1161-D) (13.4 wt. %) were dry fed into the first zone of the extruder. Using a roll-feed extruder (available from Berstorff), acrylic polymer AP-4 (4 wt. %) was heated and fed into the third zone of the extruder. Antioxidant (IRGANOX 1010) (1.3 wt. %), ultraviolet light absorber (TINUVIN 328) (1.3 wt. %), pigmented ethylene vinyl acetate (EVA; 4900 CMB) (0.4 wt. %) were dry fed; and first tackifier (REGALITE R1125) (30.9 wt. %); second tackifier (CUMAR 130) (10.3 wt. %); and plasticizer (NYPLAST 222B) (7.2 wt. %) were melt fed in to various zones of the first adhesive extruder. The compounded adhesive was fed into a silicone-coated box.

Foam Core Preparation Procedure. A foam core layer was processed in a 50 mm BONNOT single screw extruder. The extruder was operated at 120° C. The mixture was then fed into Zone 1 of a twin screw extruder (40 mm BERSTORFF (ZE-40) co-rotating twin screw extruder) where it was mixed with F-100 expandable polymeric microspheres. A standard compounding screw design was used with forward conveying, followed by kneading sections in Zone 2, reverse kneading in Zone 2, Zone 4, and Zone 6 with self-wiping conveying elements in the remaining zones. Screw speed was 125 RPM. The extruder temperature was set at 104° C., and the hose and die temperatures were set at 193° C. This temperature profile prevented expansion during compounding and minimized the rupturing of the expandable polymeric microspheres. Flow of the extrudate was controlled using a NORMAG gear pump. The expandable polymeric microspheres were metered into Zone 8 of the twin screw extruder using a KTron KCL-KC20 feeder at a rate of 0.23 kg/h. A 25.4 cm wide drop die was shimmed at 1 mm and operated at 193° C.

The compounded core layer was fed to the center layer of a three-layer, multi-manifold film die obtained from Cloeren Inc. (Orange, Tex.). The compounded skin adhesive was fed through a 50 mm BONNOT single screw extruder and fed to the outer layers of the three-layer die. This extruder was operated at 120° C.

Upon exiting the die, the co-extruded layers were cast onto a silicone release coated casting roll. The roll was cooled with water having a temperature of about 20° C. The cooled extrudate was transferred from the casting roll to a 0.117 mm thick two-side silicone coated polyethylene release liner that was transported at the same speed as the casting roll to the end of the web transport line. The first skin adhesive was in contact with the liner after the transfer whereas the second skin adhesive was open to the air. The liner had differential release properties which allows the tape to be unrolled after winding without liner confusion.

Release liners are well-known in the art, and any known release liner may be used. Typically, the release liner comprises a film or paper substrate coated with a release material. Commercially available release liners include, but are not limited to, silicone coated papers, and silicone coated films, such as polyester films. Suitable release liners are also disclosed in U.S. Pat. Nos. 6,835,422; 6,805,933; 6,780,484; and 6,204,350 assigned to 3M Innovative Properties Company.

The foam core and both adhesive skins were crosslinked on-web using electron beam curing while supported on the liner. Two sequential irradiation steps acting on opposite faces of the tape were employed. The first skin adhesive was irradiated through the polyethylene liner, whereas the second skin adhesive was irradiated in an open-face condition. The electron beam unit was an ELECTROCURTAIN CB-300 E-Beam unit (Energy Sciences Inc. (ESI), Wilmington, Mass.) with an acceleration voltage of 300 keV and a dose of 6 MRAD.

Pluck Force Test Procedure. The 30 mm by 30 mm flat faces of two T-blocks made of 6.4 mm (¼ inch) thick aluminum were primed with N200J primer from 3M Company. A 25 mm by 25 mm sample was placed between the primed faces, bonding the two T-blocks together. The T-blocks were mounted in an INSTRON tensile tester and pulled apart at a rate of 1.3 mm per minute (0.05 inches per minute). The peak separation force is reported as "Pluck force" in units of kilograms force.

Angle Cleavage Test Procedure. A 30 mm by 30 mm by 30 mm L-shaped piece of aluminum was primed on one 30 mm by 30 mm face with N200J primer from 3M Company. The primed surface was bonded to one surface of a 25 mm by 25 mm sample. The opposite surface of the sample was bonded to anodized aluminum panel that had also been primed with the N200J primer. The leg of the L-shaped piece of aluminum, which was perpendicular to the primed face, was pulled with an INSTRON tensile tester at a rate of 2.5 mm per minute (0.1 inch per minute). The peak force is reported in Table 4 in units of kilograms of force.

Foam tapes were prepared according to the Foam Core Tape Preparation Procedure. The compositions of the foam cores are summarized in Table 3. The pluck force, as measured with the Pluck Force Test Procedure is also reported in Table 3.

TABLE 3

Pluck test comparison of low and high surface area silicas.

| Sample | I.D. | Silica Surface Area | wt. % | AP-5 wt. % | AP-2 wt. % | Pluck Force kg (force) |
|---|---|---|---|---|---|---|
| EX-3 | HS-5 | 325 m²/gram | 0.7 | 89.3 | 10 | 21.5 |
| CE-4 | M-5 | 200 m²/gram | 0.7 | 89.3 | 10 | 13.3 |
| CE-5 | M-5 | 200 m²/gram | 3.5 | 86.5 | 10 | 21.6 |

Foam tapes were prepared according to the Foam Core Tape Preparation Procedure. The compositions of the foam cores are summarized in Table 4. The angle cleavage, as measured with the Angle Cleavage Test Procedure is also reported in Table 4.

TABLE 4

Affect of silica concentration on angle cleavage.

| | Foam Core Wt. % | | | | Angle |
|---|---|---|---|---|---|
| Sample | HS-5 silica | AP-1 | AP-2 | Density gm/cc (*) | Cleavage kg (force) |
| EX-4 | 0.3 | 90.1 | 9.6 | 0.61 | 11.0 |
| EX-5 | 0.5 | 89.9 | 9.6 | 0.61 | 20.3 |
| EX-6 | 0.7 | 89.7 | 9.6 | 0.61 | 17.9 |

(*) 38 pounds per cubic foot

The Angle Cleavage Test Procedure was also used to evaluate foam tapes having an alternative core composition, both with and without the addition of small amounts of a high surface area silica. The tape samples were prepared according to the Foam Core Tape Preparation Procedure except that the tape was E-beam cured from the linered side at 225 kEV and 10 MRAD and from the non-linered side (i.e., the open face side) at 250 kEV and 15 MRAD. The tape core compositions and the angle cleavage force are reported in Table 5.

TABLE 5

Affect of silica concentration on angle cleavage.

| | Foam Core Wt. % | | | | Angle |
|---|---|---|---|---|---|
| Sample | HS-5 silica | AP-3 | AP-2 | ems (a) pbw (b) | Cleavage kg (force) |
| EX-7 | 0.7 | 94.3 | 5.0 | 3.4 | 17.5 |
| CE-6 | 0 | 95.0 | 5.0 | 3.4 | 9.34 |

(a) ems = expandable microspheres (DUALITE U010-185)
(b) pbw = parts by weight based on the total weight of the silica, AP-2, and AP-3

An exemplary foam according to some embodiments of the present disclosure is shown in FIG. 1. Foam 10 comprises at least partially expanded expandable polymeric microspheres 30 and silica 40 dispersed in polymer 20.

Figure 2:
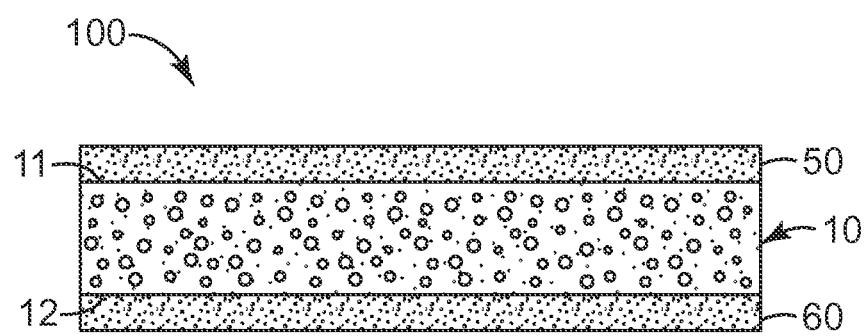
FIG. 2 illustrates an exemplary foam tape according to some embodiments of the present disclosure.

As illustrated in FIG. 2, in some embodiments of the present disclosure, a foam tape may be prepared comprising such a foam. Foam tape 100 includes foam 10 and first adhesive layer 50 bonded to first surface 11 of foam 10. In some embodiments, foam tape 100 further includes second adhesive layer 60 bonded to second surface 12 of foam 10. In some embodiments, one or both adhesive layers may be directly bonded to the foam. In some embodiments, at least one of the adhesive layers may be indirectly bonded to the foam. That is, one or more intervening layers, e.g., primer layers, may be present between an adhesive layer and the foam core.

Various modifications and alterations of this invention will become apparent to those skilled in the art without departing from the scope and spirit of this invention.

What is claimed is:

1. A foam tape comprising
   (a) a foam comprising polymer, a plurality of at least partially expanded expandable polymeric microspheres, and 0.3 to 1.5% by weight of a silica having a surface area of at least 325 square meters per gram as measured according to ASTM D1993-03(2008); and
   (b) a first adhesive bonded to a first surface of the foam, wherein the foam tape has a pluck force that is at least 62% higher than a foam tape having 0.3 to 1.5% by weight of a silica with a surface area of less than or equal to 200 square meters per gram as measured according to ASTM D1993-03(2008).

2. The foam tape according to claim 1, wherein the polymer comprises an acrylic polymer.

3. The foam tape according to claim 1, wherein the polymer comprises a blend of a low molecular weight acrylic polymer and a high molecular weight acrylic polymer.

4. The foam tape of claim 1, further comprising a second adhesive bonded to a second surface of the foam opposite the first adhesive.

5. The foam tape according to claim 4, wherein at least one of the first adhesive and the second adhesive comprises a pressure sensitive adhesive.

6. The foam tape according to claim 4, wherein at least one of the first adhesive and the second adhesive comprises a heat-activated adhesive.

7. The foam tape according to claim 4, wherein at least one of the first adhesive and the second adhesive comprises an acrylic polymer.

8. The foam tape according to claim 4, wherein at least one of the first adhesive and the second adhesive comprises a block copolymer.

9. The foam tape according to claim 4, wherein at least one of the first adhesive and the second adhesive comprises a silicone polymer.

10. The foam tape according to claim 4, wherein at least one of the first adhesive and the second adhesive comprises a blend of at least two polymers selected from the group consisting of an acrylic polymer, a block copolymer, and a silicone polymer.

\* \* \* \* \*

UNITED STATES PATENT AND TRADEMARK OFFICE
CERTIFICATE OF CORRECTION

| | | |
|---|---|---|
| PATENT NO. | : 8,652,631 B2 | Page 1 of 1 |
| APPLICATION NO. | : 13/375623 | |
| DATED | : February 18, 2014 | |
| INVENTOR(S) | : Panu Zoller | |

It is certified that error appears in the above-identified patent and that said Letters Patent is hereby corrected as shown below:

In the Specification

<u>Column 2</u>
Line 59, delete "thereof" and insert -- thereof. --

<u>Column 3</u>
Line 33, delete "thereof" and insert -- thereof. --

<u>Column 6</u>
Line 6 (approx.), delete "MIROPEARL" and insert -- MICROPEARL --

Line 20 (approx.), delete "proprionate" and insert -- propionate --

<u>Column 7</u>
Line 13, delete "cereated" and insert -- created --

Signed and Sealed this
First Day of July, 2014

Michelle K. Lee
*Deputy Director of the United States Patent and Trademark Office*